United States Patent

[11] 3,609,411

[72] Inventors Stephen P. F. Ma
Santa Monica;
Thomas J. Kosco, Harbor City, both of Calif.

[21] Appl. No. 52,495
[22] Filed July 6, 1970
[45] Patented Sept. 28, 1971
[73] Assignee Hughes Aircraft Company
Culver City, Calif.

[54] MOSFET LEVEL DETECTOR
4 Claims, 4 Drawing Figs.

[52] U.S. Cl. .......... 307/304, 307/205, 307/235, 307/251
[51] Int. Cl. .......... H03k 5/20
[50] Field of Search .......... 307/205, 251, 279, 304, 235

[56] References Cited

UNITED STATES PATENTS

| | | | |
|---|---|---|---|
| 3,134,912 | 5/1964 | Evans .......... | 307/279 |
| 3,515,901 | 6/1970 | White .......... | 307/304 X |
| 3,530,443 | 9/1970 | Crafts et al. .......... | 307/279 |

*Primary Examiner*—John S. Heyman
*Attorneys*—James K. Haskell and Bernard P. Drachlis

ABSTRACT: A metal oxide semiconductor field effect transistor (MOSFET) circuit of a type that can be constructed on a single semiconductor substrate. The circuit detects which of three possible conditions is applied to a single input. The circuit will provide a two-bit digital output signal indicative of the input condition. The circuit includes two MOSFET inverters and a MOSFET resistor divider network.

| S | OUT. 1 | OUT. 2 |
|---|---|---|
| A | 1 | 1 |
| B | 0 | 1 |
| C | 0 | 0 |

INVENTORS.
THOMAS J. KOSCO,
STEPHEN P.F. MA,
BY Bernard P. Drachlis
ATTORNEY.

| S1 | S2 | OUT.2 | OUT.3 |
|---|---|---|---|
| B | B | 1 | 1 |
| C | B | 0 | 1 |
| B | C | 1 | 0 |
| C | C | 0 | 0 |

MOSFET LEVEL DETECTOR

BACKGROUND OF THE INVENTION

This invention relates generally to semiconductor circuits and more particularly to a MOSFET circuit which will provide a digital indication of which of three possible input conditions prevails at the circuit input.

One prior art method for performing this function is to use a differential amplifier to distinguish between more than two input conditions. This method requires accurate components in the differential amplifier and accurate reference voltages.

SUMMARY OF THE INVENTION

The present invention is a semiconductor circuit which can detect three conditions applied to its input and provide a binary output signal indicative of the input condition. The circuit is of a type which can be constructed by metal oxide semiconductor field effect transistor (MOSFET) techniques on a monolithic semiconductor substrate. More particularly, the circuit includes two MOSFET inverters and two MOS field controlled resistors which form a voltage divider network. The circuit will accept two voltage conditions and an open circuit condition and will provide a two-digit binary signal indicating which of the three input conditions is applied to the circuit. The circuit may be expanded with minor modifications to detect the possible combinations of two or more two-condition input sources and also detect open circuit conditions.

DESCRIPTION OF THE DRAWINGS

The above and other novel features and advantages of the invention will become more apparent from the following detailed description, when taken in conjunction with the accompanying drawings, in which.

DESCRIPTION OF THE PREFERRED EMBODIMENT

The invention will be described in terms of a negative logic system where ground voltage level indicates a logic 0 and a negative voltage level relative to ground indicates a logic 1. It should be understood that a positive logic system could be used with appropriate changes in the supply voltages applied to the circuitry of an enhancement mode P-type substrate. All types of the circuit can be constructed on one semiconductor substrate using standard MOSFET techniques. The MOSFET circuit subsequently described in detail is constructed to operate in the enhancement mode with an N-type substrate. This means that for a MOSFET to conduct, the voltage applied to the gate of the MOSFET will be negative with respect to the voltage applied to the source of the MOSFET. The logic levels used for the circuits are ground to indicate a logic 0 and a negative voltage which may be −15 v., for example to indicate a logic 1. The source supply voltage $V_{SS}$ is at the logic 0 voltage level. The drain supply voltage $-V_{DD}$ is at the logic 1 voltage level. The gate supply voltage $-V_{GG}$ for the MOS field controlled resistors is more negative than $-V_{DD}$ and may be at −30 v., for example. Thus, a logic 1 ($-V_{DD}$) applied to the gate of a MOSFET will allow the MOSFET to conduct. The MOS-field-controlled resistors have a constant voltage ($-V_{GG}$) applied to their gates so that they continuously operate by conventional resistors.

Figures 1, 2:
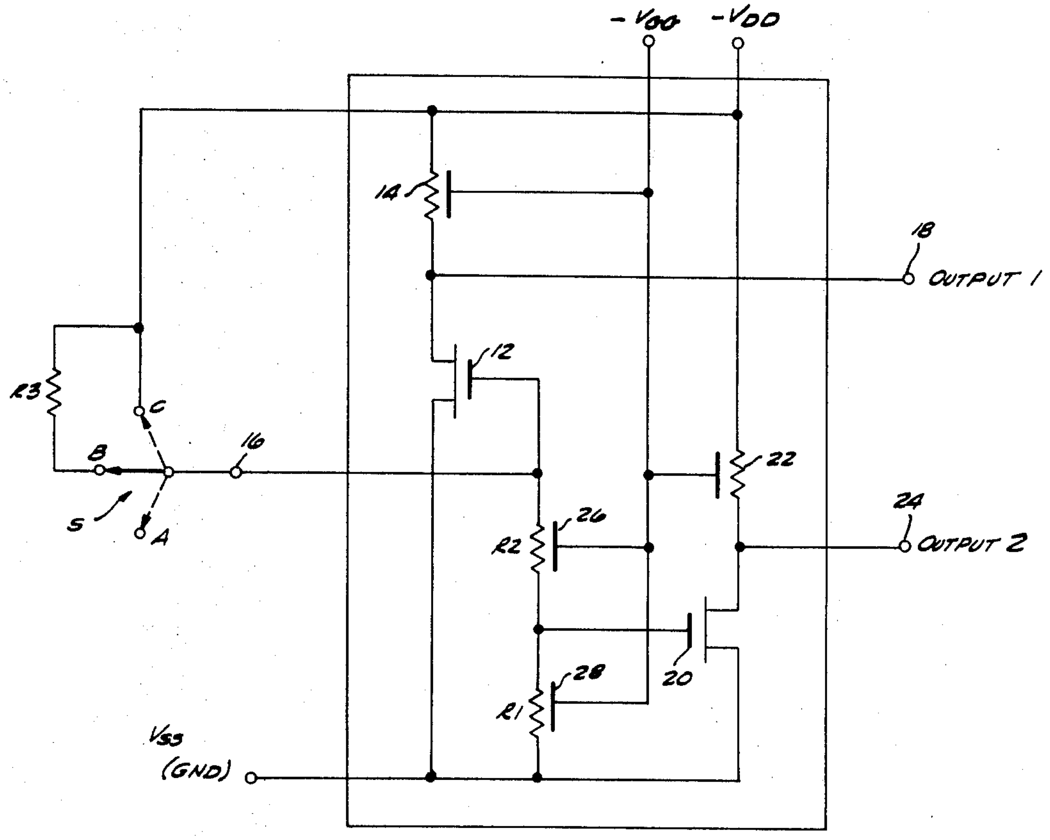
FIG. 1 is a circuit diagram illustrating the basic circuit of the present invention.
FIG. 2 is a truth table indicating the operation of the circuit of FIG. 1.

Referring now to the drawings, FIG. 1 shows the general basic circuit 10 embodying features of the present invention. All parts of the circuit 10 may be constructed on a single semiconductor substrate. A MOSFET 12 and a MOS field controlled resistor 14 are interconnected in series between the source supply voltage $V_{SS}$ and the drain supply voltage $-V_{DD}$ to form a MOSFET inverter. The input to the inverter is the gate of the MOSFET 12 which is connected to an input terminal 16 of the circuit 10. The output of the inverter is taken from the common junction of the source and drain of the MOSFET 12 and the MOS-field-controlled resistor 14. The inverter output is connected to output terminal 18 which is further identified as OUTPUT 1. A MOSFET 20 and a MOS-field-controlled resistor 22 are interconnected in series between the source supply voltage $V_{SS}$ and the drain supply voltage $-V_{DD}$ to form another MOSFET inverter. The input to this inverter is the gate of the MOSFET 20. The output of the inverter is taken from the common junction of the source and drain of the MOSFET 20 and the MOS-field-controlled resistor 22. The inverter output is connected to output terminal 24 which is further identified as OUTPUT 2. Two MOS-field-controlled resistors 28 and 26 further identified as R1 and R2 respectively are connected in series between the input terminal 16 and the source supply voltage $V_{SS}$ (ground). The MOS-field-controlled resistors R1 and R2 form voltage divider network. The common junction of the source and drain of the resistors R1 and R2 is connected to the gate of the MOSFET 20.

The three-condition input to the circuit 10 is shown symbolically in FIG. 1 as three-position switch S having positions A, B and C. Position A is representative of open circuit. Position B is representative of the logic 1 voltage level $-V_{DD}$ minus a voltage drop resulting from current passed through a series resistor R3. Position C is representative of logic 1 voltage $-V_{DD}$. The circuit 10 will operate to provide a two-digit binary output signal indicative of the switch position.

FIG. 2 shows a table giving the output signals at OUTPUT 1 and OUTPUT 2 for each of three switch positions. The column in the table labeled S lists the three switch positions. The column labeled OUT 1 indicates the logic levels of the output terminal 18 for each of the three switch positions. The column labeled OUT 2 indicates the logic levels of the output terminal 24 for each of the three switch positions. The column labeled OUT 2 indicates the logic levels of the output terminal 24 for each of the three switch positions. A"1" in the table of FIG. 2 indicates a logic 1output signal from the particular output terminal. A "0" in the table indicates a logic 0 output signal from the particular output terminal.

The operation of the circuit shown in FIG. 1 will now be described. Recall that the MOS-field-controlled resistors have a constant voltage $-V_{GG}$ applied to their gates so that the MOS-field-controlled resistors operate as conventional resistors. For switch position A, the input terminal 16 will receive an open circuit condition. This will provide no useable signal at the gate of MOSFET 12 and will prevent MOSFET 12 from conducting, and no current will flow through the MOS-field-controlled resistor 14. In this condition, logic 1 voltage level $-V_{DD}$ will show through the MOS-field-controlled resistor 14 to the output terminal 18. Also, since input terminal 16 is an open circuit, no current will flow through MOS-field-controlled resistors R1 and R2 and the gate of the MOSFET 20 will be effectively open-circuited. This will prevent the MOSFET 20 from conducting and no current will flow through the MOS-field-controlled resistor 22. The logic 1 level $-V_{DD}$ will show through the MOS-field-controlled resistor 22 to the output terminal 24.

For switch position B, the logic 1 voltage level $-V_{DD}$ minus a voltage drop resulting from current passing through the resistor R3 will be applied to the input terminal 16. The MOS-field-controlled resistors R1 and R2 and resistor R3 form a voltage divider network. The resistance of the resistor R3 is chosen in proper relationship to the resistances of the MOS-field-controlled resistors R1 and R2 so that current flow through the resistor network will provide a voltage at the input terminal 16 which, when applied to the gate of MOSFET 2, will allow MOSFET 12 to conduct and current will flow through MOSFET 12 DD MOS-field-controlled resistor positions. all of the voltage drop will be across the MOS-field-controlled resistor 14 which will place the common junction of MOSFET 12 and MOS-field-controlled resistor 14 at ground and thereby place output terminal 18 at logic 0 (ground). The resistances of the MOS-field-controlled resistors R1 and R2 are chosen in proper ratios to allow the voltage produced at their common junction to be insufficient when applied to the gate of MOSFET 20 to allow MOSFET 20 to conduct. With MOSFET 20 nonconducting, no current will flow through the MOS-field-controlled resistor 22. The logic 1 voltage level $-V_{DD}$ will show through the MOS-field-controlled resistor 22 to the output terminal 24.

For switch position C, logic 1 voltage level $-V_{DD}$ will be applied to input terminal 16. This will apply logic 1 to the gate of MOSFET 12 and will allow MOSFET 12 to conduct and current will flow through MOSFET 12 and MOS-field-controlled resistor 14. Substantially all of the voltage drop will be across the MOS-field-controlled resistor 14 which will place the common junction of MOSFET 12 and MOS-field-controlled resistor 14 at ground and thereby place output terminal 18 at logic 0. MOS-field-controlled resistor R1 and R2 are chosen in proper resistance ratios such that when logic 1($-V_{DD}$) is applied to input terminal 16, the voltage at the common junction of MOS-field-controlled resistors R1 and R2, when applied to the gate of MOSFET 20, will be sufficient to allow MOSFET 20 to conduct. When MOSFET 20 conducts, current will flow through MOSFET 20 and MOS-field-controlled resistor 22. Substantially all of the voltage drop will be across the MOS-field-controlled resistor 22 which will place the common junction of MOSFET 20 and MOS-field-controlled resistor 22 at ground and thereby output terminal 24 will be placed at logic 0. This completes the description of the operation of the circuit of FIG. 1 in accordance with the table of FIG. 2.

It should be understood that the resistances of the MOS-field-controlled R1 and R2 and resistor R3 will depend upon the threshold switching level for the MOSFET's may be approximately –4 v., for example. This means that for a MOSFET to conduct, a voltage more negative than –4 v. will have to be applied to its gate. Conversely, for a MOSFET to be nonconducting, a voltage more positive than –4 v. will be applied to its gate. Thus, it can be seen that a voltage range between the threshold voltage and the logic 1 voltage level($-V_{DD}$) is available as a logic 1 input to the gate of the MOSFET's. The resistor R1, R2 and R3 will have their resistances chosen such that voltages resulting from current flow therethrough ill applied to the gates of the MOSFET to produce the appropriate output signals for the various input conditions. More particularly, for the various input conditions. More particularly, for the exemplary operating voltages given above, it has been found that a volume for R1 of 24k. ohms, a value for R2 of 31k. ohms, and a value for R3 of 110k. ohms will allow the circuit to operate quite satisfactorily.

The circuit overcomes some of the difficulties of the prior art methods since all components are manufactured at the same time and are on the same semiconductor substrate. Any variation due to the manufacturing process will affect the resistances of both MOS-field-controlled resistors R1 and R2. In this way, the ratio between the resistance of resistor R1 and the resistance of resistor R2 can be kept fairly accurate without special procedures. Also, since the resistors R1 and $2 are fabricated on the same semiconductor substrate, variations in resistance due to temperature variation will be substantially the same for both resistors R1 and R2 and again the ratio of the resistance values will be kept fairly accurate. The resistor R3 is external to the semiconductor circuit and may have variations of up to 10 percent for normal types of resistors. However, since the resistance value of R3 is much greater than the resistance values for resistors R1 and R2, variations of up ±10 percent in the resistance value of R3 will not substantially affect the operation of the circuit.

Figures 3, 4:
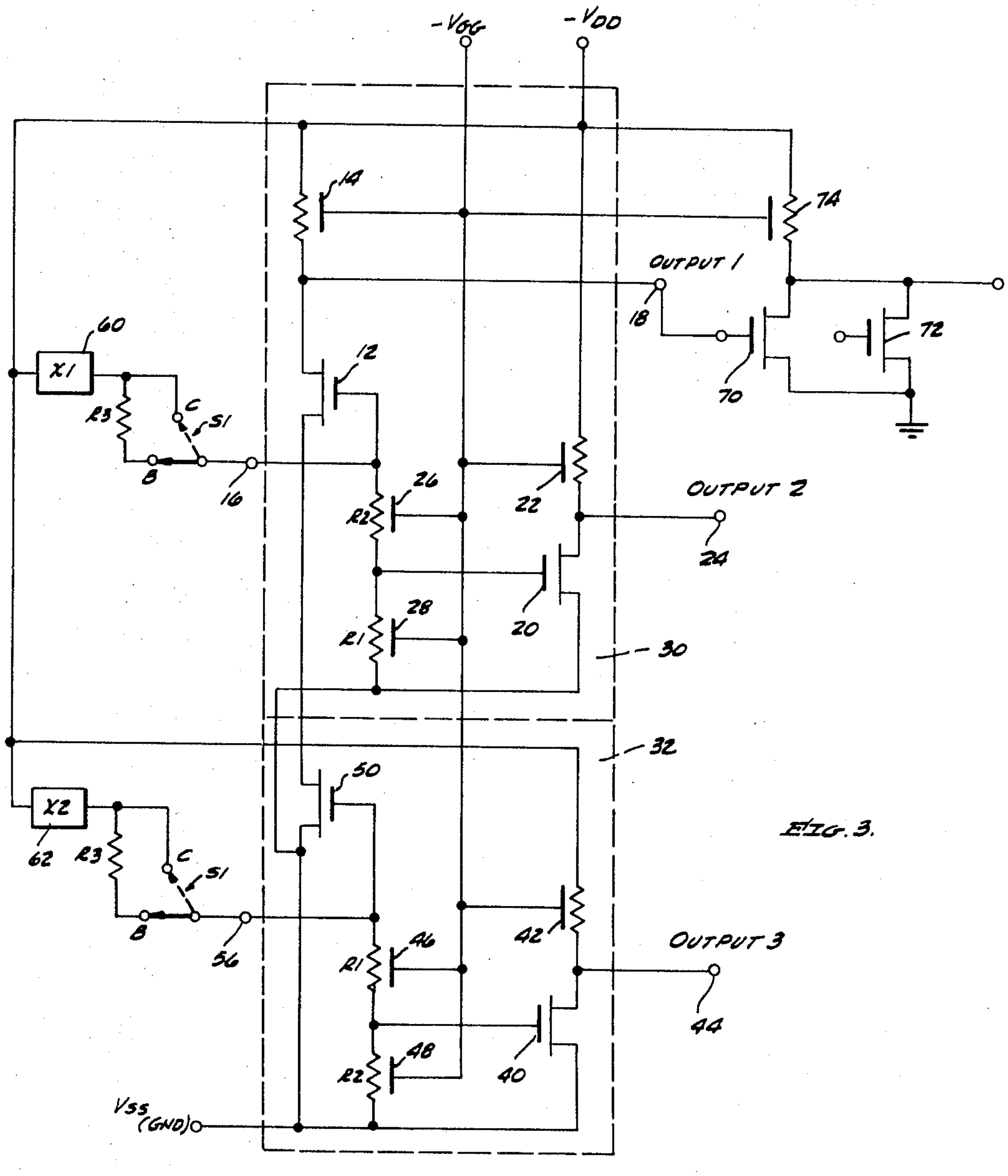
FIG. 3 illustrates another embodiment of the invention.
FIG. 4 is a truth table indicating the operation of the circuit of FIG. 3.

More than one circuit may be produced on a single semiconductor substrate to handle input from more than one input device. The basic circuit shown in FIG. 1 may be expanded and modified slightly to provide digital indications of a plurality of two-position switch inputs along with an open circuit indication. Such a circuit is shown in FIG. 3. For convenience of description, the circuit of FIG. 3 is shown generally as being in two parts. The first part indicated generally with reference numeral 30 is identical in construction and operation with the circuit 10 of FIG. 1. The second part of the circuit shown in FIG. 3 and indicated generally with reference numeral 32, is similar in construction to the circuit 10 of FIG. 1, except that the MOS-field-controlled resistor 14 is eliminated. MOSFET 40, MOS-field-controlled resistors 42, 46 and 48 , and output terminal 44 correspond to MOSFET 20, MOS-field-controlled resistors 22, 26, 28, and output terminal 24, respectively. The signal terminals of MOSFET 50 of the circuit 32 are connected in series with the signal terminals of MOSFET 12 of the circuit 30. The MOSFET's 12 and 50 and the MOS-field-controlled resistor 14 form a MOSFET NAND gate.

The inputs to the circuits of FIG. 3 are shown symbolically as switches S1 and S2. Switch S1 is coupled to input terminal 45 of circuit 32. The operation of the circuit 30 of FIG. 3 for OUTPUT 2 is identical with that described above for the circuit 10 of FIG. 1 for OUTPUT 2. Likewise, the operation of the circuit 32 of FIG. 3 for OUTPUT 4 is identical with that described above for the circuit 10 of FIG. 1 for OUTPUT 2. It should be noted that switches S1 and S2 may be switched independently of each other to give four possible combinations of switch positions . This will provide four possible combinations of digital output signals at OUTPUT 2 and OUTPUT 3. FIG. 4 gives a truth table for the OUTPUTS 2 and 3 of FIG. 3 for the switch positions B and C of switches S1 and S2. With switch S1 in position B, a logic 1 signal will be applied to output terminal 24 (OUTPUT 2). With switch S1 in position C, a logic 0 will be applied to output terminal 24 (OUTPUT 2). With switch 52 in position B, a logic 1 signal will be applied to output terminal 44 (OUTPUT 3). With switch S2 in position C, a logic 0 will be applied to output terminal 44 (OUTPUT 3).

FIG. 3 shows a generalized circuit component S1, identified with reference numeral 60, in series with switch S2. These circuit components may be of any type which will indicate an open circuit condition. .This circuit component may be a fuse, for example. In the normal operating condition where circuit components X1 and X2 are not open circuited, sufficient voltage is applied, in either switch position B or C, to the gates of MOSFET 12 and MOSFET 50 to allow there MOSFET's to conduct and provide logic 0 at output terminal 18 (OUTPUT 1). If either of the circuit components X1 or X2 provide an open circuit condition, the associated X1 will not conduct and a logic 1 signal will be applied to output terminal 18 (OUTPUT 1). For example, if circuit component X1 provides an open circuit condition, there will be no voltage applied to the gate of MOSFET 12. This will prevent MOSFET 12 from conducting and no current will flow through MOS-field-controlled resistor 14. Logic 1 voltage level $-V_{DD}$ will show through MOS-field-controlled resistor 14 to output terminal 18. Similarly, if circuit component X2 provides an open circuit condition, MOSFET 50 will not conduct and logic 1 voltage level $-V_{DD}$ will show through MOS-field-controlled resistor 14 to output terminal 18.

It should be understood that the signal of output terminal 18 (OUTPUT 1) may be used in various ways to provide a visual or other indication of an open circuit . For example, the signal from OUTPUT 1 may be applied to a NOR gate as indicated in FIG. 3 by MOSFET's 70 and 72, and MOS-field-controlled resistor 74. If the signal applied to the gate of either MOSFET 70 or MOSFET 72 is a logic 1, then a logic 0 will be applied to the output of the NOR gate circuit. The input to the gate of MOSFET 72 may be from other condition indication circuits. The output of the NOR gate may then be used to provide a visual or other indication of a particular circuit condition.

It should be understood that the circuit shown in FIG. 3 could be expanded by adding additional circuits as shown generally by reference numeral 32 to accept additional input sources. For example, if another input source were added, another circuit identical to that shown by reference numeral 32 could be provided and eight possible combinations of input source conditions could be obtained with eight possible combinations of binary output signals.

What is claimed is:

1. A circuit of the type that can be constructed on a monolithic semiconductor substrate by metal oxide semiconductor field effect transistor techniques said circuit being coupled to receive an input which may have three possible signal conditions for providing a first and a second digital output signal in response to the input signal condition, said circuit comprising:

a first MOSFET inverter coupled to receive the input to the circuit for providing the first digital output signal of a first level in response to the first input signal condition and of a second level in response to the second and third input signal conditions;

first and second MOS-field-controlled resistors interconnected in series circuit relationship and coupled to receive the input to said circuit for providing a voltage signal at the common interconnection between said MOS field controlled resistors corresponding to the input voltage condition;

a second MOSFET inverter coupled to receive the voltage signal from the common interconnection of said MOS-field-controlled resistor for providing the second digital output signal of a first level in response to the first and second input signal conditions and of a second level in response to the third input signal condition.

2. A circuit of the type that can be constructed on a monolithic semiconductor substrate by metal oxide semiconductor field effect transistor techniques, said circuit being coupled to receive a plurality of input signals, each of which may have two possible voltage conditions and an open circuit condition for providing a plurality of digital output signals, said circuit comprising:

a MOSFET gate having a plurality of inputs, each coupled to receive an individual one of said plurality of input signals for providing an output signal of a first level when any one of the plurality of input signals has an open circuit condition and of a second level when none of the plurality of input signals has an open circuit condition;

a plurality of MOS-field-controlled resistor voltage divider networks, each coupled to receive an individual one of said plurality of input signals for providing a voltage signal 1 corresponding to the input signal condition;

a plurality of MOSFET inverters, each coupled to receive the voltage signal from an individual one of said plurality of MOS-field-controlled resistor voltage divider networks for providing a digital output signal of a first level in response to the first input signal condition and of a second level in response to the second input signal condition.

A circuit of the type that can be constructed on a monolithic semiconductor illustrated by metal oxide semiconductor field effect transistor techniques, said circuit having an input terminal, a first output terminal and a second output terminal and being responsive to a first supply voltage, a second supply voltage, a third supply voltage and an input which may have three possible signal conditions for providing a first and a second digital output signal, said circuit comprising:

a first MOSFET having a first signal terminal coupled to the first supply voltage, a second signal terminal, and a gate terminal coupled to the input terminal, said first MOSFET conducting when its gate terminal is at a predetermined voltage level;

a first MOS-field-controlled resistor having a first signal terminal coupled to the second signal terminal, a second signal terminal coupled to the second supply voltage, and a gate terminal coupled to the third supply voltage;

a second MOSFET having a first signal terminal coupled to the first supply voltage , a second signal terminal, and a gate terminal, said second MOSFET conducting when its gate terminal is at a predetermined voltage level;

a second MOS-field-controlled resistor having a first signal terminal coupled to the second signal terminal of said second MOSFET and to the second output terminal, a second signal terminal coupled to the second supply voltage, and a gate terminal coupled to the third supply voltage;

a third MOS-field-controlled resistor having a first signal terminal coupled to the first supply voltage, a second signal terminal coupled to the gate terminal of said second MOSFET, and a gate terminal coupled to the third supply voltage; and a fourth MOS-field-controlled resistor having a first signal terminal coupled to the second signal terminal of said third MOS-field-controlled field controlled resistor, a second signal terminal coupled to the input terminal, and a gate terminal coupled to the third supply voltage.

4. A circuit as claimed in claim 3 wherein the second supply voltage is more negative than the first supply voltage and the third supply voltage is more negative than the second supply voltage.

PO-1050
(5/69)

UNITED STATES PATENT OFFICE
CERTIFICATE OF CORRECTION

Patent No. 3,609,411 Dated September 28, 1971

Inventor(s) Stephen P. F. Ma and Thomas J. Kosco

It is certified that error appears in the above-identified patent and that said Letters Patent are hereby corrected as shown below:

Col. 1, line 68, "by" should be --as--;
Col. 2, lines 38-40, delete "The column ... positions."
line 60, after "logic 1" insert --voltage--;
line 71, "2" should be --12--;
lines 73 and 74, delete "DD MOS-field-controlled resistor positions.";
Col. 3, line 19, "resistor" should be --resistors--;
line 34, before "R1" insert --resistors--;
line 35, "MOSFET's" should be --MOSFETs--;
line 35, before "may be" insert --12 and 20. With typical MOSFET circuitry, using the voltage levels described above, a threshold level for the MOSFETs--;
line 43, "MOSFET's" should be --MOSFETs--;
lines 47 and 48, delete "More particularly, for the various input conditions."
line 50, "volume" should be --value--;
line 60, "$2" should be --R2--;
line 72, "input" should be --inputs--;
Col. 4, line 15, "MOSFET's" should be --MOSFETs--;
line 20, delete "45" and insert --16 of circuit 30 and switch S2 is coupled to input terminal 56--;
line 23, "4" should be --3--;
line 34, "52" should be --S2--;
line 38, "S1" should be --X1--;
line 39, "S2" should be --S1--;
line 39, before "These" insert --FIG. 3 also shows a generalized circuit component X2 identified with reference numeral 62 in series with switch S2.--;
line 45, "there" should be --these--;
line 45, "MOSFET's" should be--MOSFETs--;
line 48, "X1" should be --MOSFET--;
line 65, "MOSFET's" should be --MOSFETs--;

PO-1050
(5/69)

UNITED STATES PATENT OFFICE
CERTIFICATE OF CORRECTION

Patent No. 3,609,411 Dated September 28, 1971

Inventor(s) Stephen P. F. Ma and Thomas J. Kosco

It is certified that error appears in the above-identified patent and that said Letters Patent are hereby corrected as shown below:

Col. 5, line 47, delete "l";
Col. 6, line 7, before "A" insert --3.--;
line 8, "illustrated" should be --substrate--;
line 21, after "terminal" insert --of said first MOSFET and to the first output terminal,--;
line 41, delete "field controlled" second instance.

Signed and sealed this 2nd day of January 1973.

(SEAL)
Attest:

EDWARD M.FLETCHER,JR.
Attesting Officer

ROBERT GOTTSCHALK
Commissioner of Patents